(12) United States Patent
Merkel et al.

(10) Patent No.: US 6,564,420 B1
(45) Date of Patent: May 20, 2003

(54) WIPER ARM WITH INTEGRAL NUT

(75) Inventors: Wilfried Merkel, Kappelrodeck (DE); Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 09/762,799

(22) PCT Filed: Aug. 5, 2000

(86) PCT No.: PCT/DE00/02623
§ 371 (c)(1),
(2), (4) Date: May 1, 2002

(87) PCT Pub. No.: WO01/12481
PCT Pub. Date: Feb. 22, 2001

(30) Foreign Application Priority Data

Aug. 17, 1999 (DE) .......................... 199 38 969

(51) Int. Cl.⁷ .................................. B60S 1/34
(52) U.S. Cl. .............................. 15/250.34; 15/250.351; 15/250.31; 403/2; 403/11; 403/12; 403/21; 411/2; 411/999
(58) Field of Search ....................... 15/250.34, 250.351, 15/250.352, 250.31; 403/2, 11, 12, 21; 411/2, 3, 4, 5, 999

(56) References Cited

U.S. PATENT DOCUMENTS

| | | | | | |
|---|---|---|---|---|---|
| 2,442,697 A | * | 6/1948 | Krohm | ........................ | 403/254 |
| 5,729,860 A | * | 3/1998 | Lisiecki | .................... | 15/250.34 |
| 5,865,581 A | * | 2/1999 | Sadri et al. | ..................... | 411/5 |

FOREIGN PATENT DOCUMENTS

DE 44 08 732 A 9/1995

OTHER PUBLICATIONS

Patent Abstracts of Japan vol. 008, No. 16 (M–270_, Jan. 24, 1984 & JP 58 177752 A, Oct. 18, 1983.

* cited by examiner

Primary Examiner—Gary K. Graham
(74) Attorney, Agent, or Firm—Michael J. Striker

(57) ABSTRACT

The invention is a wiper arm (20) for securement to a drive shaft (10,12). The wiper arm (20) has a securing part (18), which on one end has a bearing point (16) by way of which the wiper arm can be connected, in a manner fixed against relative rotation, to the drive shaft (10, 12) via a nut (14). The nut can be screwed onto the drive shaft (10,12). The nut is formed by a component integrally cast onto the securing part (18) and is connected to the securing part (18) via a binding (26) that can be released upon installation of the wiper arm (20).

8 Claims, 4 Drawing Sheets

WIPER ARM WITH INTEGRAL NUT

BACKGROUND OF THE INVENTION

The invention is based on an apparatus for securing a wiper arm to a drive shaft.

Wiper systems with a plurality of windshield wipers for motor vehicles are secured with their wiper bearings to the body of the motor vehicle directly or indirectly via a mounting plate. The mounting plate carries a wiper drive with a wiper motor, whose motor shaft, via a rod linkage, drives cranks that are solidly connected to one end of a drive shaft for each windshield wiper. It is also possible for only the drive shaft of one windshield wiper to be driven by the wiper motor, while another windshield wiper is connected to the first windshield wiper via a four-bar lever mechanism and has a bearing shaft. The drive shaft or bearing shaft is supported in a wiper bearing. The remarks below pertaining to a drive shaft apply equally to a bearing shaft, which will no longer be expressly named.

At least one radial bearing is provided in the bearing housing, and one axial bearing is provided between the bearing housing and a part solidly connected to the drive shaft. The drive shaft protrudes out of the vehicle body and moves a wiper arm, secured on its free end, with a wiper blade over a windshield. The wiper arm as a rule has a securing part that is connected to the drive shaft in a manner fixed against relative rotation and is pivotably connected to a hinge part to which a wiper rod is rigidly joined. It is also possible for the wiper arm not to be connected directly to the drive shaft but instead to be driven via a lever mechanism with a drive lever connected to the drive shaft in a manner fixed against relative rotation. The following remarks pertaining to connecting the securing part to the drive shaft apply equally to a drive lever, which will no longer be expressly named.

In known windshield wipers, on one end the securing part has a bearing point with a female cone, with which in a first mounting step the securing part, upon mounting of the wiper arm, is placed on a suitably shaped male cone of the drive shaft. Next, in a second mounting step, a nut is screwed onto the drive shaft, and by way of this nut the securing part is pressed with the female cone onto the male cone of the drive shaft. In order to achieve a positive engagement in addition to a nonpositive engagement, it is known for knurled teeth or knurled cutting edges to be integrally formed onto the cone of the drive shaft. Depending on the diameter of the drive shaft, from 29 to 44 knurled cutting edges are provided over the circumference; they are oriented longitudinally of the drive shaft and have a triangular cross-sectional area with an angle of 90°. The height and cross-sectional area of the knurled cutting edges increase as the diameter of the cone increases, so that the entire jacket face of the cone is covered with knurled cutting edges.

SUMMARY OF THE INVENTION

The invention is based on an apparatus for securing a wiper arm to a drive shaft. The wiper arm has a securing part, which on one end has a bearing point by way of which the securing part can be connected, in a manner fixed against relative rotation, to the drive shaft via a nut that can be screwed onto the drive shaft.

It is proposed that the nut is formed by a component integrally cast onto the securing part and is connected to the securing part via a binding that can be undone when the wiper arm is installed. This dispenses with one additional component, and the bearing outlay, logistical effort and mounting effort can be reduced and costs can be saved. If the wiper arm is shipped to the customer in the preassembled state, the nut is connected in captive fashion to the securing part. This makes an additional premounting of the nut on the securing part unnecessary. The nut can be secured by the binding to various points of the securing part, but preferably the nut is disposed above the bearing point, in a mounting position; preferably, the binding is integrally formed on between the face end of the nut pointing toward the securing part and the securing part. The mounting can be done especially quickly and economically and in particular can easily be automated. In the mounting position, the nut can be grasped and screwed directly onto a drive shaft. The binding is advantageously formed by a thin-walled cylinder, which in terms of production technology is simple to form or cast integrally.

In one feature of the invention, it is proposed that the securing part is supported with the bearing point via a female cone on a male cone of the drive shaft, and the drive shaft has teeth, integrally formed onto the male cone, by way of which teeth both a nonpositive and a positive engagement can be made between the drive shaft and the securing part, the height of the teeth remaining constant over the jacket face of the cone. In the mounting process, the teeth deform the material of the securing part uniformly. The securing part can be made to rest on the entire conical jacket face of the drive shaft with an only slight tightening moment of a securing nut or with an only slight axial force. Inexpensive materials with low wall thicknesses can be employed. Furthermore, because of the low tightening moment required, the securing nut can especially advantageously be jointly cast onto the securing part in a single method step, comprising an inexpensive and lightweight material, such as plastic, zinc, aluminum, magnesium, and so forth.

An only partial contact of the securing part on the tips of the teeth, especially in the lower region of the cone, can be avoided, and the nonpositive and positive engagement between the drive shaft and the securing part can be improved. Furthermore, inlay parts, especially in the case of plastic securing parts, can be avoided.

The teeth can be integrally formed on using various methods that appear suitable to one skilled in the art, such as non-metal-cutting creative forming or reshaping, such as rolling with a knurling tool, extrusion, deep drawing in the case of components made from sheet metal, or by metal-cutting methods, such as milling, broaching, and so forth. The teeth can also have various shapes, such as pyramid-shaped, conical, and so forth. In one feature of the invention, it is propose that the teeth are formed by cutting edges oriented essentially in the longitudinal direction, which in the longitudinal direction have a constant height and preferably have a constant cross-sectional area. Cutting edges oriented in the longitudinal direction can be produced especially economically and bring about a good positive engagement.

It is also proposed that the spacing in the circumferential direction between each two teeth at the same axial height on the drive shaft is adapted to the tensile strength of the materials used for the drive shaft and for the securing part, and with decreasing tensile strength of the material for the securing part relative to the tensile strength of the material for the drive shaft, the spacing between the teeth increases.

The shear strength of the teeth on the drive shaft and of the material comprising the securing part that is located between the teeth can be fitted to one another, and overall, the highest possible shear strength and the highest possible transmissible torque can be achieved at only a slight tightening moment of the securing nut. If the spacing in the circumferential direction is relatively great, then fewer teeth can be mounted on the cone for the same diameter of the drive shaft. If the teeth are integrally formed onto a male cone of a steel drive shaft that has a rated diameter of 8 mm below the cone and according to DIN has a surface hardness of at least 135 HBS to 200 HBS, then advantageously from 30 to 40 cutting edges for a steel securing part, 20 to 30 cutting edges for a zinc or aluminum securing part, 15 to 25 cutting edges for a magnesium securing part, and 5 to 15 cutting edges for a plastic securing part, are advantageously integrally formed onto the drive shaft over the circumference of the conical jacket face. In drive shafts with a lesser or greater rated diameter, correspondingly fewer or more cutting edges are disposed over the circumference.

It is furthermore possible by means of the shape, width and especially height of the teeth, to fit the allowable maximum loads in the circumferential direction of the teeth and of the material of the securing part located between the teeth to one another, and to achieve an overall maximum allowable transmissible torque. Advantageously, the height of the teeth increases as the tensile strength of the material for the securing part decreases relative to the tensile strength of the material for the drive shaft.

BRIEF DESCRIPTION OF THE DRAWING

Further advantages will become apparent from the ensuing drawing description. In the drawing, exemplary embodiments of the invention are shown. The drawing, description and claims include numerous characteristics in combination. One skilled in the art will expediently consider the characteristics individually as well and put them together to make useful further combinations.

Shown are.

DESCRIPTION OF THE PREFERRED EMBODIMENT

Figure 1:
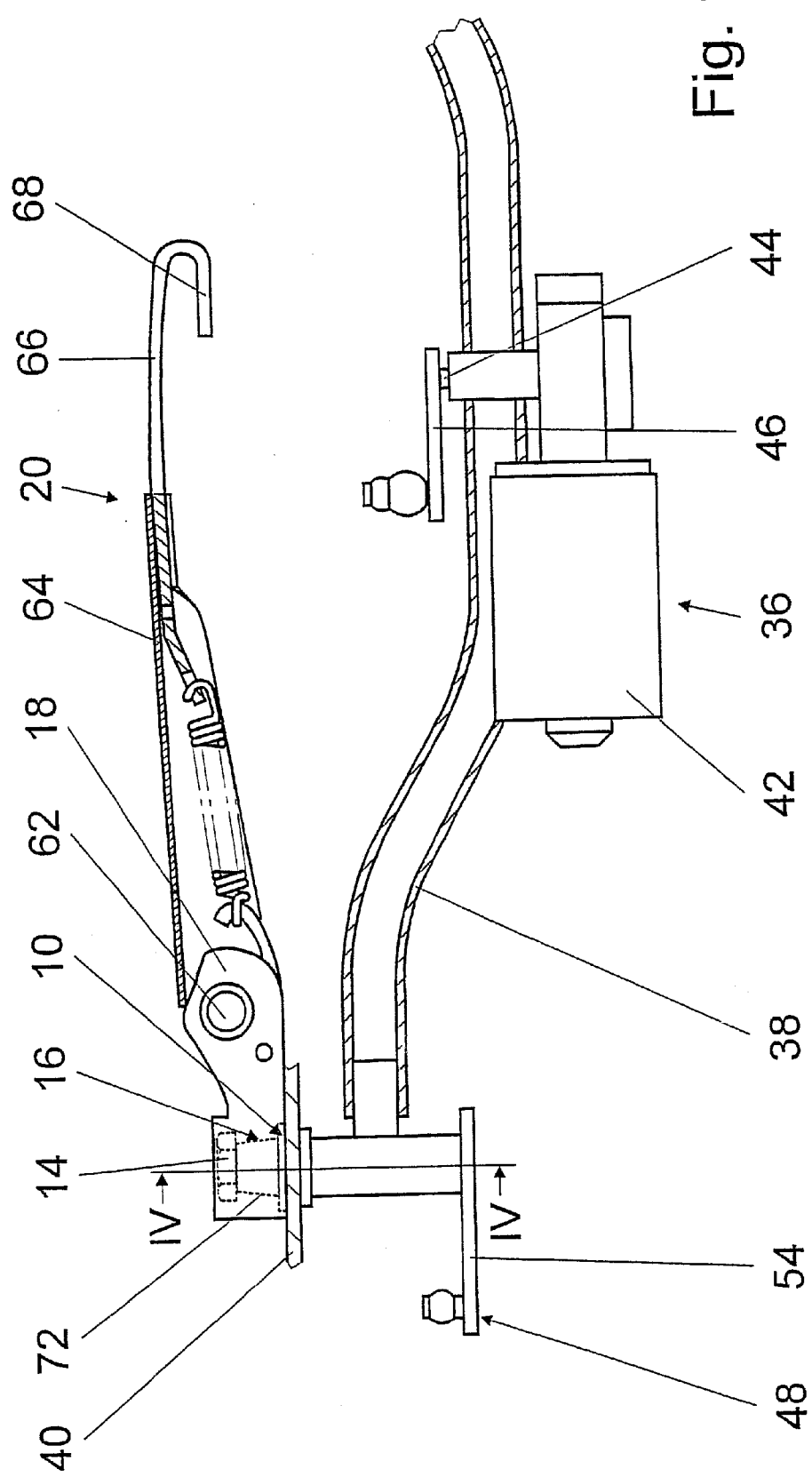
FIG. 1, a detail of a wiper system having a wiper arm, in section.

FIG. 1 shows a detail of a wiper system 36 for a motor vehicle, whose wiper bearings are secured to the body 40 of the motor vehicle via a mounting plate 38. The mounting plate 38 carries a wiper drive with a wiper motor 42, whose motor shaft 44, via a crank 46 and a rod linkage not further shown, drives cranks 48 that are each solidly connected to one end of a drive shaft 10 for a windshield wiper. The drive shaft 10 is supported (FIG. 4) in a bearing housing 56 of the wiper bearing radially via bearing bushes 50, 52 and in a first axial direction via a crank arm 54 and in a second axial direction via a clamping ring 58 and a runner ring 60. The drive shaft 10 protrudes out of the body 40 and moves a wiper arm 20, secured by its free end, with a wiper blade not shown in further detail over a windshield (FIG. 1). The wiper arm 20 has a securing part 18, which is pivotably connected via a toggle joint 62 to a hinge part 64, which is rigidly adjoined by a wiper rod 66. The wiper blade is suspended from a bracketlike end 68 of the wiper rod 66. The securing part on one end has a bearing point 16, by way of which the securing part 18 can be connected in a manner fixed against relative rotation to the drive shaft 10, via a nut 14 that can be screwed onto the drive shaft 10.

Figure 2:
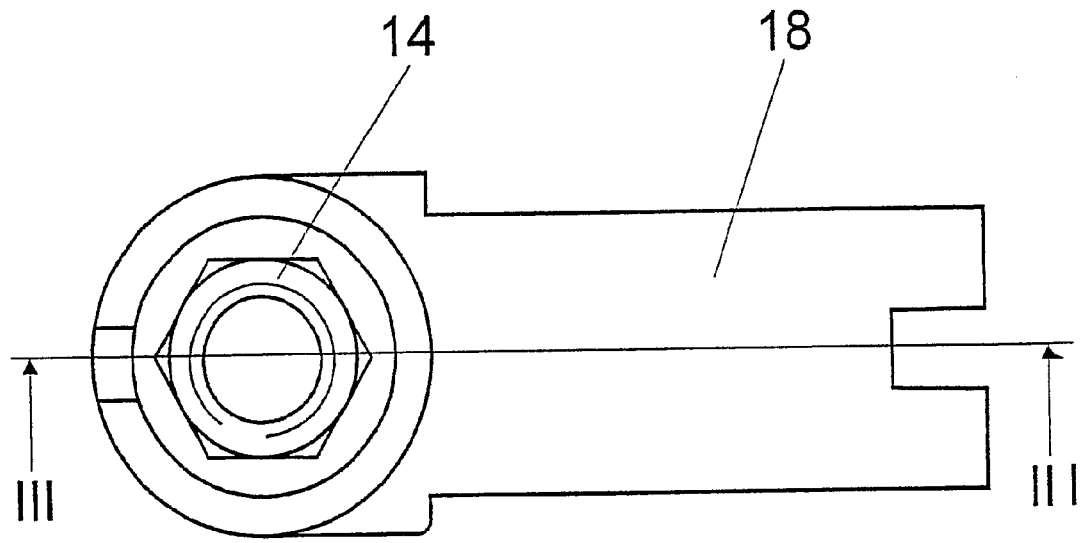
FIG. 2, a securing part seen from above, before an initial mounting.
Figure 3:
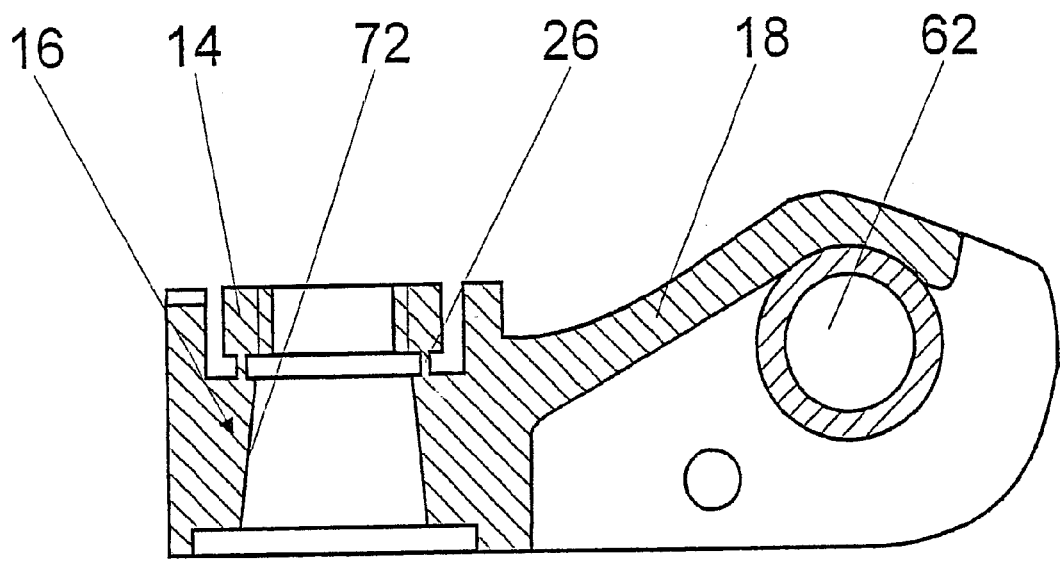
FIG. 3, a section taken along the line III—III of FIG. 2.

According to the invention, the nut 14 is formed by a component integrally cast onto the securing part 18 and is connected to the securing part 18 via a binding 26 that can be undone upon mounting of the wiper arm 20 (FIGS. 2 and 3). The nut 14 is disposed above the bearing point 16 in a mounting position, and the binding 26 is formed integrally in the form of a thin-walled cylinder between the face end of the nut 14, pointing toward the securing part 18, and the securing part 18 itself. The binding 26 breaks as soon as the nut, on being screwed onto the drive shaft 10, is loaded with a torque. The securing part 18 and the nut 14 are made of aluminum in a single method step, specifically a die-casting process. It is also possible to make the securing part and the nut of plastic, zinc, magnesium, and so forth.

Figure 4:
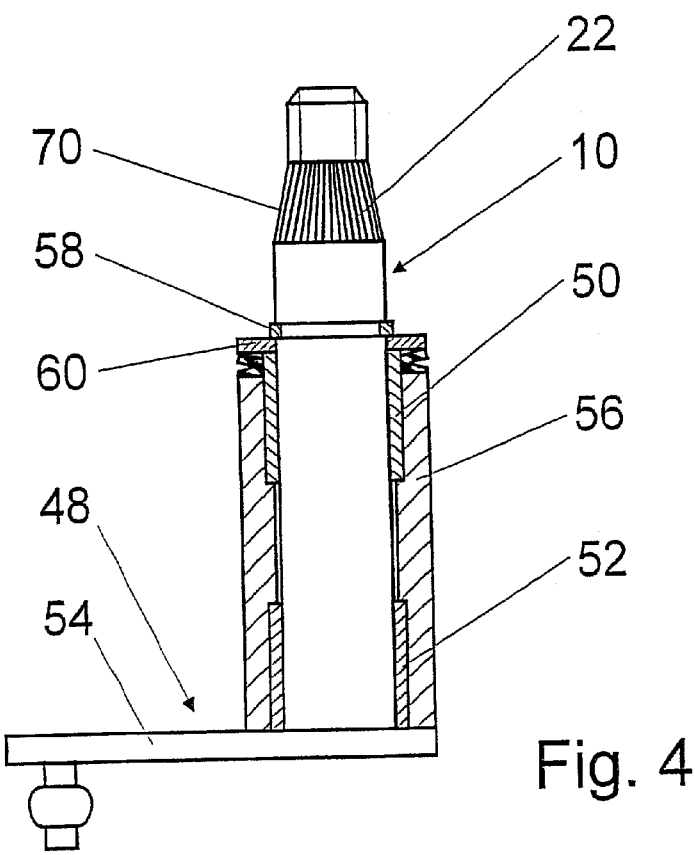
FIG. 4, a section taken along the line IV—IV of FIG. 1 without the securing part.
Figure 5:
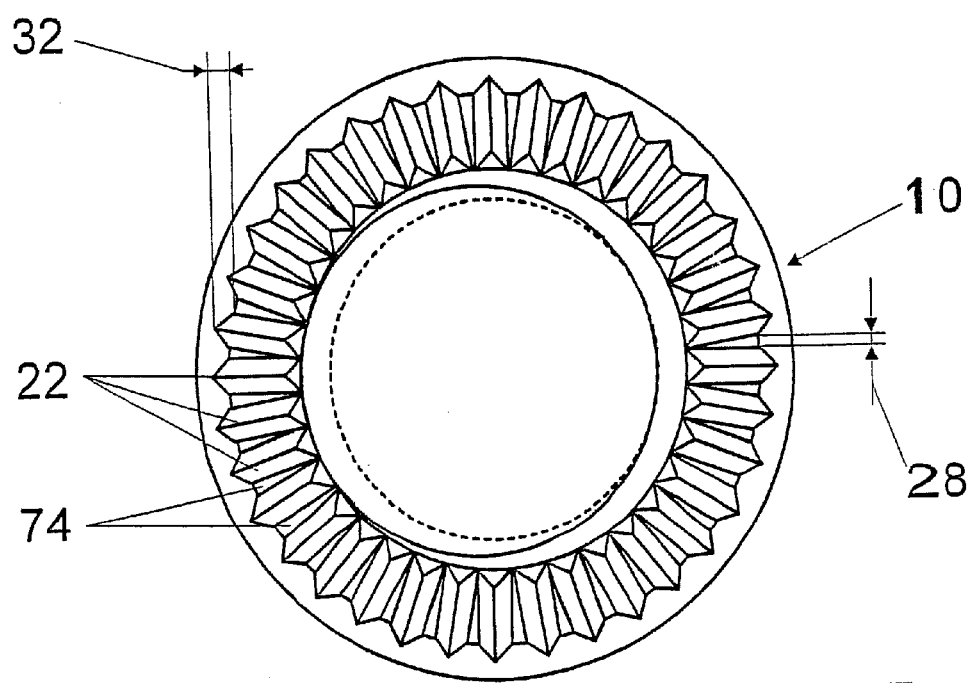
FIG. 5, an enlarged view of a drive shaft from above.

The drive shaft 10 comprises a harder material than the securing part 18, and on a male cone 70 it has teeth or knurled cutting edges 22, oriented longitudinally of the shaft, which in the mounting of the securing part 18 on the drive shaft 10 are pressed into a jacket face of a female cone 72 of the securing part 18 and establish not only a nonpositive but also a positive engagement between the drive shaft 10 and the securing part 18 (FIGS. 1, 4 and 5). According to the invention, the knurled cutting edges 22 have a constant height 32 in the longitudinal direction; that is, they are the same height as one another from the base of the tooth to the tip of the tooth, and they preferably have a constant cross-sectional area. This creates smooth conical jacket faces 74 between the knurled cutting edges 22.

Upon mounting, the material of the securing part 18 is deformed uniformly over the length of the knurled cutting edges 22. The securing part 18 can be brought to rest with a low tightening moment using the nut 14 or with a slight axial force on the entire conical jacket face of the drive shaft 10. The securing part 18 is prevented from resting only partly on the tips of the knurled cutting edges 22, especially in the lower region of the male cone 70, and a good nonpositive and positive engagement is achieved between the drive shaft 10 and the securing part 18.

Figure 6:
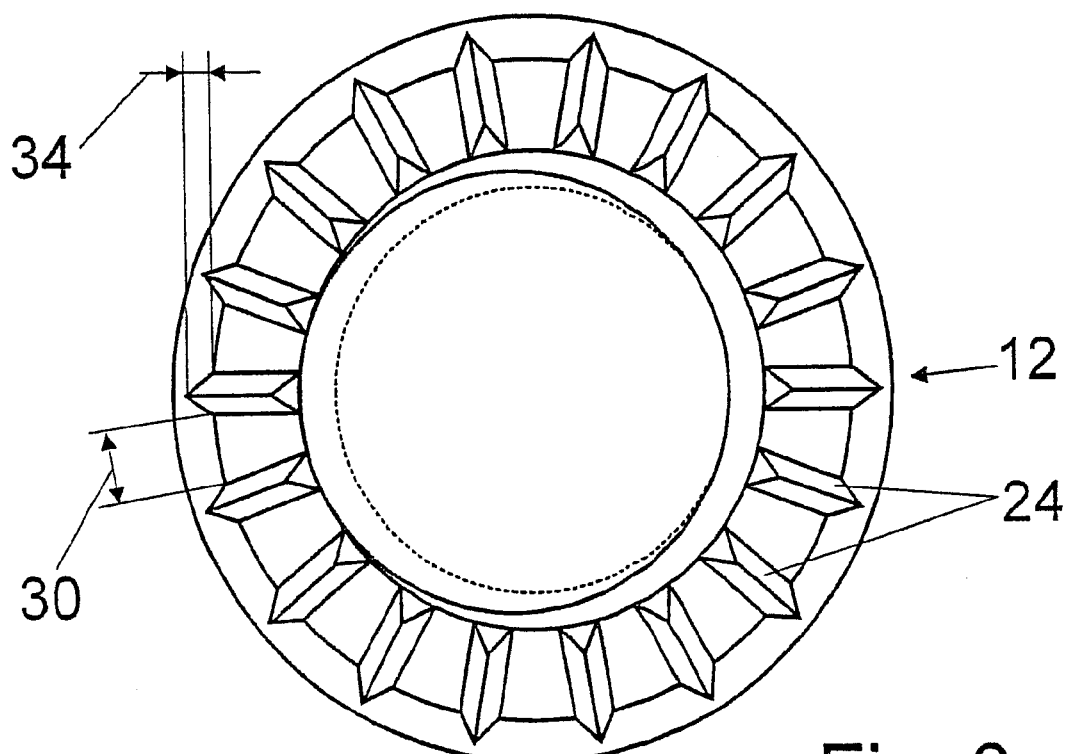
FIG. 6, a variant of FIG. 4 for a securing part made of a material of low tensile strength.

In FIG. 6, a drive shaft 12 with knurled cutting edges 24 is shown for a securing part which is made from a material of lesser tensile strength than the securing part 18, specifically for a securing part of magnesium. The spacing 30 between the knurled cutting edges 24 is greater than the spacing 28 between the knurled cutting edges 22 in the exemplary embodiment of FIG. 5. For the same diameter of the drive shafts 10 and 12, fewer knurled cutting edges 24 are formed integrally onto the drive shaft over its circumference. The shear strength of the knurled cutting edges 24 on the drive shaft 12 and of the material of the securing part existing between the knurled cutting edges 24 are fitted to one another, so that overall the maximum possible shear strength and the maximum allowable transmissible torque are achieved. To fit the allowable maximum stress on the knurled cutting edges 24 and on the material between the knurled cutting edges 24 of the securing part to one another, the knurled cutting edges 24 furthermore have a greater height 34 than the knurled cutting edges 22. As in the exemplary embodiment of FIGS. 1–5, however, the knurled cutting edges 24 have a constant height 34 and a constant cross-sectional area in the longitudinal direction.

What is claimed is:

1. A wiper arm (20) for securing a drive shaft (10, 12), in which the wiper arm (20) has a securing part (18), which on one end has a bearing point (16) by way of which the securing part (18) can be connected, in a manner fixed against relative rotation, to the drive shaft (10, 12) via a nut (14) that can be screwed onto the drive shaft (10, 12), characterized in that the nut (14) is formed by a component integrally cast as one piece with the securing part (18) and is connected to the securing part (18) via a binding (26) that can be undone when the wiper arm (20) is installed.

2. The wiper arm of claim 1, characterized in that the nut (14) is disposed above the bearing point (16), in a mounting position.

3. The wiper arm of claim 2, characterized in that the binding (26) is integrally formed on and between a face end of the nut (14) pointing toward the securing part (18) and the securing part (18).

4. The wiper arm of claim 3, characterized in that the binding (26) is formed by a thin-walled cylinder.

5. The wiper arm of claim 1, characterized in that the securing part (18) is supported with the bearing point (16) via a female cone (72) on a male cone (70) of the drive shaft (10, 12), and the drive shaft (10, 12) has teeth (22, 24), integrally formed onto the male cone (70), by way of which teeth both a nonpositive and a positive engagement can be made between the drive shaft (10, 12) and the securing part (18), a height (32, 34) of the teeth (22, 24) remaining constant over a jacket face of the cone.

6. The wiper arm of claim 5, characterized in that the teeth (22, 24) are formed by cutting edges oriented essentially in a longitudinal direction.

7. The wiper arm of claim 5 characterized in that a spacing (28, 30) in a circumferential direction between each two teeth (22, 24) at a same axial height on the drive shaft (10, 12) is adapted to the tensile strength of the materials used for the drive shaft (10, 12) and for the securing part (18) such that as the tensile strength of the material for the securing part (18) decreases relative to the tensile strength of the material for the drive shaft (10, 12), the spacing (28, 30) between the teeth (22, 24) increases.

8. The wiper arm of claim 5, characterized in that the height (32, 34) of the teeth (22, 24) is adapted to the tensile strength of the materials used for the drive shaft (10, 12) and for the securing part (18) such that as the tensile strength of the material for the securing part (18) decreases relative to the tensile strength of the material for the drive shaft (10, 12), the height (32, 34) of the teeth (22, 24) increases.

* * * * *